United States Patent [19]

Dempsey

[11] 4,095,806
[45] Jun. 20, 1978

[54] SEAL ARRANGEMENT

[75] Inventor: John D. Dempsey, Lynchburg, Va.

[73] Assignee: The Babcock & Wilcox Company, New York, N.Y.

[21] Appl. No.: 813,135

[22] Filed: Jul. 5, 1977

[51] Int. Cl.² .............................................. F16J 15/40
[52] U.S. Cl. ........................................ 277/27; 277/74; 277/96
[58] Field of Search .................... 277/3, 27, 81 R, 74, 277/82, 96 R, 96.1, 96.2, 135

[56] References Cited

U.S. PATENT DOCUMENTS

| | | | |
|---|---|---|---|
| 3,093,382 | 6/1963 | Macks | 277/96 A X |
| 3,179,422 | 4/1965 | Phillips | 277/3 |
| 3,495,841 | 2/1970 | Lindeboom | 277/27 |
| 3,511,510 | 5/1970 | Lindeboom | 277/74 X |
| 3,685,839 | 8/1972 | Frei | 277/27 |
| 3,917,289 | 11/1975 | Ivanov et al. | 277/74 |
| 3,926,442 | 12/1975 | Müller | 277/74 X |

FOREIGN PATENT DOCUMENTS

| | | | |
|---|---|---|---|
| 1,422,767 | 11/1965 | France | 277/3 |
| 891,419 | 3/1962 | United Kingdom | 277/27 |

*Primary Examiner*—Robert S. Ward, Jr.
*Attorney, Agent, or Firm*—Joseph M. Maguire; Angelo Notaro

[57] ABSTRACT

A hydraulically balanced face type shaft seal is provided in which the opening and closing seal face areas retain concentricity with each other in the event of lateral shaft displacement. All of the areas affected by the hydraulic force balance are embodied either by the rotating or stationary seal member, and the radial width of the sealing face of a second seal member is sufficiently wider than that of the first member so as to preclude runoff at maximum lateral displacement of the shaft at the seal.

6 Claims, 13 Drawing Figures

SEAL ARRANGEMENT

BACKGROUND OF THE INVENTION

1. Field of the Invention

This invention relates to a centrifugal liquid barrier with pressure responsive loading means. More particularly, the invention relates to pressure balanced face seals suitable for vertical pumps applied in a high pressure and high temperature environment.

2. Summary of the Prior Art

A dynamic pump seal basically comprises a stationary member coacting with a rotating member to control or prevent the leakage of fluids along a rotating shaft. A variety of dynamic seals are known including, illustratively, face contact, controlled leakage, labyrinth, visco and centrifugal seals. The features which characterize the different seals may be used separately or in combination. In a static seal, contrastingly, no relative motion exists between the seal and the mating surface to be sealed.

Dynamic seals are popularly further categorized as face seals where the members are disposed with the sealing interface orientated transversely to the longitudinal axis of the shaft. The stationary and rotating members are separated by a thin hydrodynamic fluid film between the members, thereby insuring lower friction and increasing seal life. The thin film of liquid between the seal faces not only lubricates these surfaces but provides a force keeping the surfaces from actual contact. It is customary to have one of the sealing members rigidly mounted and the other mounted to float, i.e., to permit axial and angular motion. Axial forces, mechanically and hydraulically applied, maintain the faces in close proximity such that the film thickness value between the seal faces is usually less than five-thousands of an inch with values of 20 to 100 microinches being common. Since a gap and pressure differential exists, there will be some leakage. This leakage is incipient, however, because of the extremely small clearance. Since film thickness values are so small, the flatness of the seal faces is extremely important in minimizing wear. For this reason, the seal faces are usually precision lapped until they are flat to within one helium light band, i.e., about 12 microinches, to eliminate asperities. Face seal leakage is a function of the axial forces acting on the sealing members. In a face seal, these forces may press an axially floating non-rotating ring against a fixed running counterface or an axially floating rotating ring against a fixed stationary counterface.

The axial leakage path between the floating member and the shaft is generally closed by a secondary static seal, such as an O-ring, which allows primary movement of the primary seal without axial leakage. Face seals are satisfactory so long as friction and wear are not excessive. As speed and pressure increase, however, rubbing contacts become less tolerable and the maintenance of a fluid film between the seal faces more imperative. To limit the unit loading on the coacting faces, most high-pressure seals are hydraulically balanced. Balancing is the geometric arrangement of the seal assembly to lower the load between the rotating and stationary faces. By varying the diameters of each seal member, specified unit pressures can be attained at the seal interface. Typically, the closing force on the floating member barely overcomes the opening force created by the pressure between the seal faces to provide a minimum unit loading between coacting seal faces, thereby, promoting seal life. In high pressure applications, in order to further reduce the acting on the seal and to prevent leakage, multiple face contact seals have been spaced axially along the shaft and the seals which are adjacent to each other bridged by pressure reducing means to provide a reduced pressure differential across the seal faces.

In many applications, the trend has been to use the system thermodynamic working fluid which is being sealed as the lubricating film to overcome possible contamination problems and, in nuclear applications in particular, the breakdown of standard lubricants as a result of radiation.

Face seals have been utilized in nuclear power systems for sealing large vertical reactor coolant pumps. Vertical pumps have a shaft axis which is vertically disposed. Reactor coolant pumps generally circulate water through the reactor, steam generator, and associated piping, developing the requisite head to overcome fluid friction losses and to transport heat from the nuclear reactor to the steam generators. In pressurized water reactor systems, a pressurizer may be utilized to establish and maintain a system pressure in excess of 2000 psia. The high pressure is required to prevent boiling at high system temperatures typically in excess of 500° F. The reactor coolant pump seals, therefore, must be designed to operate under these conditions.

The availability of nuclear reactors has been limited due to the frequent necessity to perform repairs on reactor coolant pump seals. Operational problems encountered with seals in reactor coolant pumps have included excessive leakage, heat checking of the rotating member, excessive secondary seal wear, shaft sleeve fretting or wear, uneven wear of the stationary seal member, sensitivity to temperature changes, secondary seal hang-up, frequent destaging and sensitivity to pump shaft motion.

Many of the presently operating reactor coolant pumps are designed such that the seals are not located near a bearing. This design arrangement appears to be uniquely predominant only in the large vertical type pumps being used in nuclear reactor systems. Due to the three bearing arrangement presently found in most reactor coolant pump-motor combinations, pump shaft lateral displacements are much greater than are traditionally found on machinery. In addition, the seals are positioned near the point of greatest shaft displacement. Also, it is known that the pump shaft moves up or down due to changes in the pump's axial thrust. When a running reactor coolant pump is secured, for example, the normal impeller down thrust is discontinued, and an increased net upward force is exerted due to high reactor coolant system pressure. At low system pressure, the weight of the shaft causes a downward thrust. Total axial shaft motion has been measured and found to vary from 80 mils to 120 mils depending upon the type of motor employed and conditions in the reactor coolant system. Only approximately 10 mils is due to motor thrust bearing clearances, the rest being attributable to motor housing and bearing support deflections and thermal growth.

Dynamic lateral shaft displacements have been found to vary in operating plants over a range of 5 to 22 mils during steady state operations. Depending upon the manufacturing and alignment tolerances, shaft displacement will vary from pump to pump. Moreover, there will always be a tendency for some shaft displacement due to the radial load at the impeller. Shaft vibration and runout also contribute to shaft displacement although these phenomena may counteract the generally stationary force attributed to radial thrust.

Hence, it appears that although seal technology is well advanced, the effects of the operating environment and bearing arrangement in nuclear reactor coolant pump applications have combined to yield less than satisfactory seal performance. Optimal seal development has, heretofore, been hindered by failure to synthesize recently recognized phenomena affecting seal performance with those which are more readily apparent.

The recently recognized phenomena, which are characterized herein as hydraulic moment unbalance and secondary seal loading and cyclic motion, and which are fully described hereinafter, result in rapid wear of the seal faces and instability of the axially movable member as well as rapid degradation of the secondary seal. The phenomena are associated with the bearing arrangement described hereinbefore.

Other readily recognizable phenomena have acted to confound efforts to achieve satisfactory seal performance in conjunction with hydraulic moment unbalance and secondary seal cyclic motion. These known phenomena include seal ring moment deflections due to thermal, hydraulic or mechanical loads, seal wobble due to shaft tilt or seal housing deflections, and the inability of the floating member to dynamically track its mating seal member during shaft axial displacement.

Accordingly, there is a need for a seal, suitable for use in reactor coolant pumps, which is not affected by hydraulic moment unbalance and otherwise satisfactorily performs its sealing function.

SUMMARY OF THE INVENTION

According to the present invention, a hydraulically balanced face type seal assembly is provided such that the profiles of the closing and opening areas retain concentricity with each other in the event of lateral shaft displacement.

In accordance with one embodiment of the invention a seal assembly is constructed such that an annular seal ring functions as a non-rotating axially floating balance member. An annular rotating seal runner which coacts with the seal ring to form the primary seal interface is provided with sufficient transverse width to preclude edge runoff of seal ring upon maximum lateral shaft displacement.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Hydraulic moment unbalance, as described and defined herein, does not appear to have previously been recognized in the art.

Hydraulic moment unbalance is primarily due to lateral shaft displacement. Traditional practice in the design of high pressure floating face seals is to adjust seal member areas in a manner to balance the hydraulic forces acting to squeeze the seal faces together. The hydraulic balance ratio ($b$) is defined as the ratio of two areas, i.e., the net closing area (Ac) which, as schematically illustrated in FIGS. 2, 3, 6 and 7, is the area bounded by the balancing diameter (C) and the outer diameter (A) of the sealing face, and the net opening area ($A_o$) which is the area bounded by the outer diameter (A) and inner diameter (B) of the sealing face.

Under balanced conditions, the opening and closing areas are concentric (FIG. 2), uniform hydraulic force distributions are applied to the opening and closing areas, and the sum of the hydraulic closing forces on the seal is larger than the sum of the hydraulic opening forces so that the sealing surfaces are not forced apart. Hence, the net closing force (neglecting friction forces of the static sealing element, and the spring forces, if any) or the net hydraulic force is equal to the hydraulic force ($P_F$) exerted by the pressure in the fluid interface applied by the interface pressure over the opening area which may be calculated from the formula $$P_F = U_L A_o$$

where $U_L$ is the unit load. The unit load is a function of (1) the pressure differential and distribution across the seal inteface and (2) the balance ratio, and is expressed by the formula $$U_L = (P_1 - P_2)(b - K)$$

where $P_1$ and $P_2$ are, respectively, the pressures on the high and low pressure sides of the seal, and $K$ is a factor representing the variation of the interface pressure over the sealing interface width and depends on the parallelism of the faces. When the seal faces are parallel and a linear pressure distribution or drop exists across the sealing interface, the K factor is equal to 0.5. The balance ratio, $b$ must be greater than 0.5 to assure that the seal faces do not part.

Figure 1A:
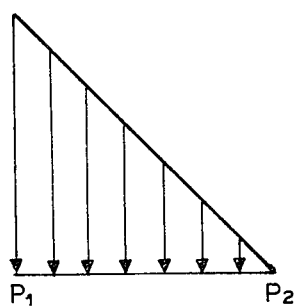
FIG. 1 is a diagrammatic representation of the seal interface pressure distribution for seal faces which are parallel (FIG. 1A), which diverge in the radial direction toward the shaft centerline (FIG. 1B), and which converge in the radial direction toward the shaft centerline (FIG. 1C)
Figure 1B:
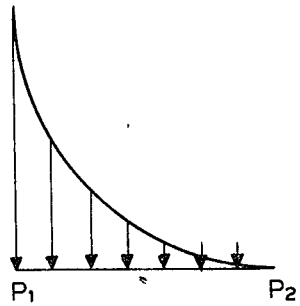
Figure 1C:
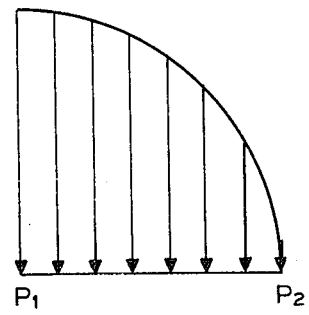

If the seal faces are not parallel and a converging or diverging (in the direction of the center of the shaft centerline) film profile results, the value of the K factor is, respectively, greater or less than 0.5. FIGS. 1A, 1B and 1C illustrate the variation of the interface pressure from the high pressure ($P_1$) to low pressure ($P_2$) side of the seal, respectively, where the K factor equals 0.5 (seal faces parallel), is less than 0.5 (film divergent) and is greater than 0.5 (film convergent).

Figure 2A:
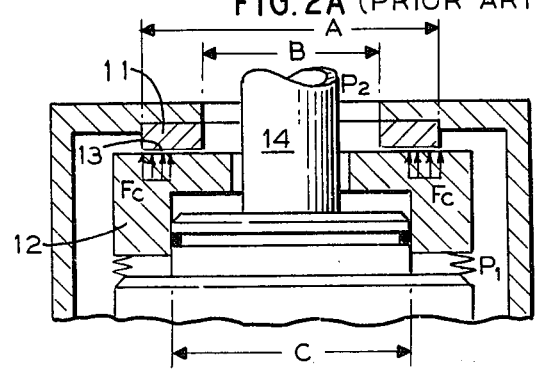
FIG. 2 includes a sectional view (FIG. 2A) of a prior art seal arrangement showing part of a shaft and seal assembly in elevation, and a diagrammatic superposed planar view (FIG. 2B) of the counteracting concentric hydraulic opening and closing area profiles.
Figure 3A:
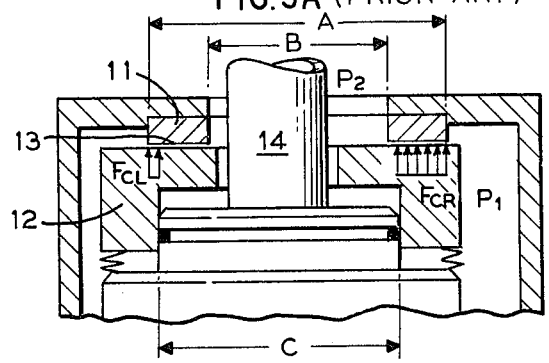
FIG. 3 includes a sectional view (FIG. 3A) of the seal arrangement of FIG. 2 wherein the shaft has been displaced to the left and a diagrammatic superposed planar view (FIG. 3B) of the counteracting eccentric hydraulic opening and closing area profiles.
Figure 2B:
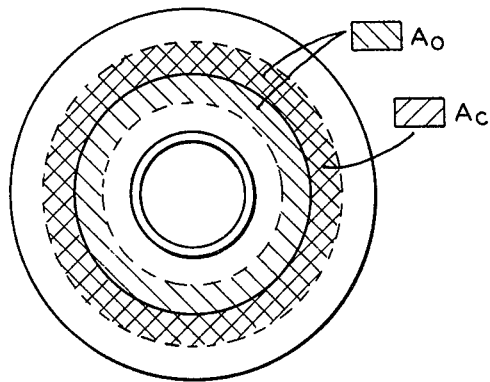
Figure 3B:
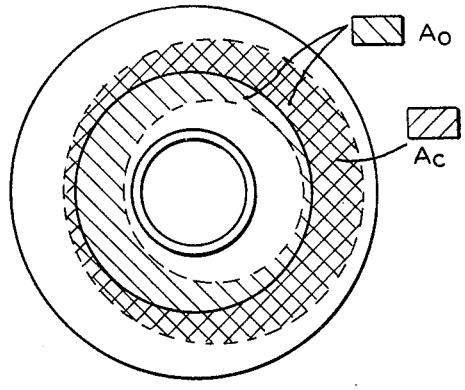
Figure 4:
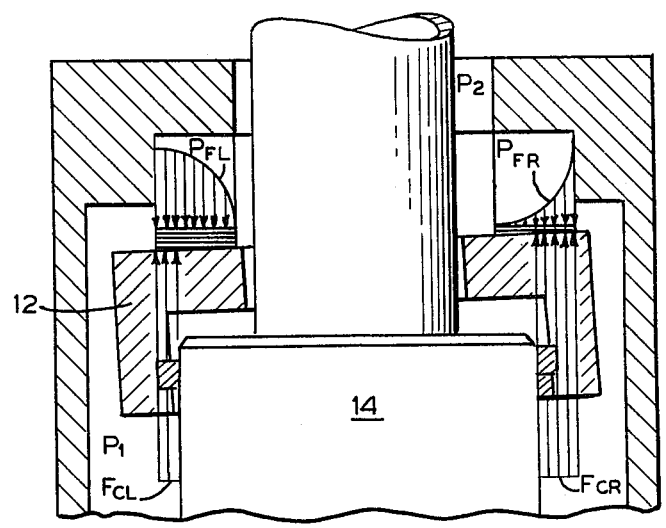
FIG. 4 is a schematic representation of the net hydraulic and face load force profiles in shaft seal arrangement in which hydraulic moment unbalance is occurring.

If, however, the concentricity of the areas is lost, e.g., during lateral shaft displacement, the net hydraulic force profile is not uniformly applied to the closing area and the axially floating seal member is subject to a hydraulic moment. The tilting of the floating member, in turn, causes the interface film profile on the right to diverge and on left to converge. Loss of seal member concentricity has occurred in nuclear reactor coolant pumps due to the atypical lateral shaft deflections experienced at the seals as a consequence of the motor-pump bearing spacing. FIGS. 2 and 3 schematically illustrate a prior art seal and the effect of hydraulic moment unbalance. In FIG. 2 the centerline of the non-rotating seal member 11 is coincident with the centerline of the rotating seal member 12 such that the opening ($A_o$) and closing ($A_c$) areas are relatively concentric as shown in the superposed view (FIG. 2B). The net hydraulic closing force ($F_C$) is uniformly distributed over the annular closing area $A_c$, and is hydraulically balanced by the film pressure in the interface 13 of the seal members which results in the application of a hydraulic force $P_F$ (not shown) over the area $A_o$. If, however, the shaft 14 is displaced to the left, as shown in FIG. 3, the opening ($A_o$) and closing ($A_c$) areas lose concentricity relative to each other as is best shown in the superposed schematic view of these areas in FIG. 3B. Hence, the net hydraulic closing force distribution on the right ($F_{CR}$) exceeds that on the left ($F_{CL}$), resulting in hydraulic moment unbalance. The tilting of the floating member, in turn, causes the interface film hydraulic force profile on the right ($P_{FR}$) to diverge and on left ($P_{FL}$) to converge relative to the seal member 12 as is shown in FIG. 4 (in which seal member 11 has been omitted for clarity). If the shaft is displaced far enough, the opening force exerted by the pressure in the fluid interface on the left side ($P_{FL}$), will exceed the net hydraulic closing force on the left side ($P_{CL}$) and the seal will be forced open. The amount of shaft displacement which can be tolerated is dependent upon the rate of uneven wear on the precision lapped sealing faces which results from the uneven face loading.

Hydraulic moment unbalance may develop, therefore, as a result of the seal faces running off the ends of each other, and in any face seal arrangement which allows the closing area to be out of concentricity with respect to the opening area. This can result in excessively high unit loads on one side of the seal and a zero or an opening load at the other side.

In nuclear reactor coolant pumps, the major cause of hydraulic moment unbalance is lateral shaft displacement. As previously noted, due to the bearing arrangement, the reactor coolant pump seals are generally positioned near the point of greatest displacement which is much greater than is traditionally found on machinery. Also, affecting shaft displacement, and in some circumstances mitigating the effects of hydraulic moment unbalance, are eccentricity of the various parts due to fabrication tolerances, assembly misalignments, displacement due to radial thrust and shaft vibration.

A secondary seal radial load and cyclic motion are generated by hydraulic moment unbalance. When the primary seal has a concentric pressure profile, torsional forces due to seal friction are evenly distributed over the entire contacting secondary seal face area. When the shaft is displaced, however, torque due to the hydraulic unbalance causes a radial loading to occur on the secondary seal causing greater torsional forces at the points where the load is concentrated. Since the radial load is stationary, the secondary seal is subjected to cyclic decompression and compression in seal arrangements where it rotates with the shaft. This explains the excessive secondary seal wear that has occurred in the prior art seals and is also satisfactorily resolved by the elimination of hydraulic moment unbalance.

Figure 5:
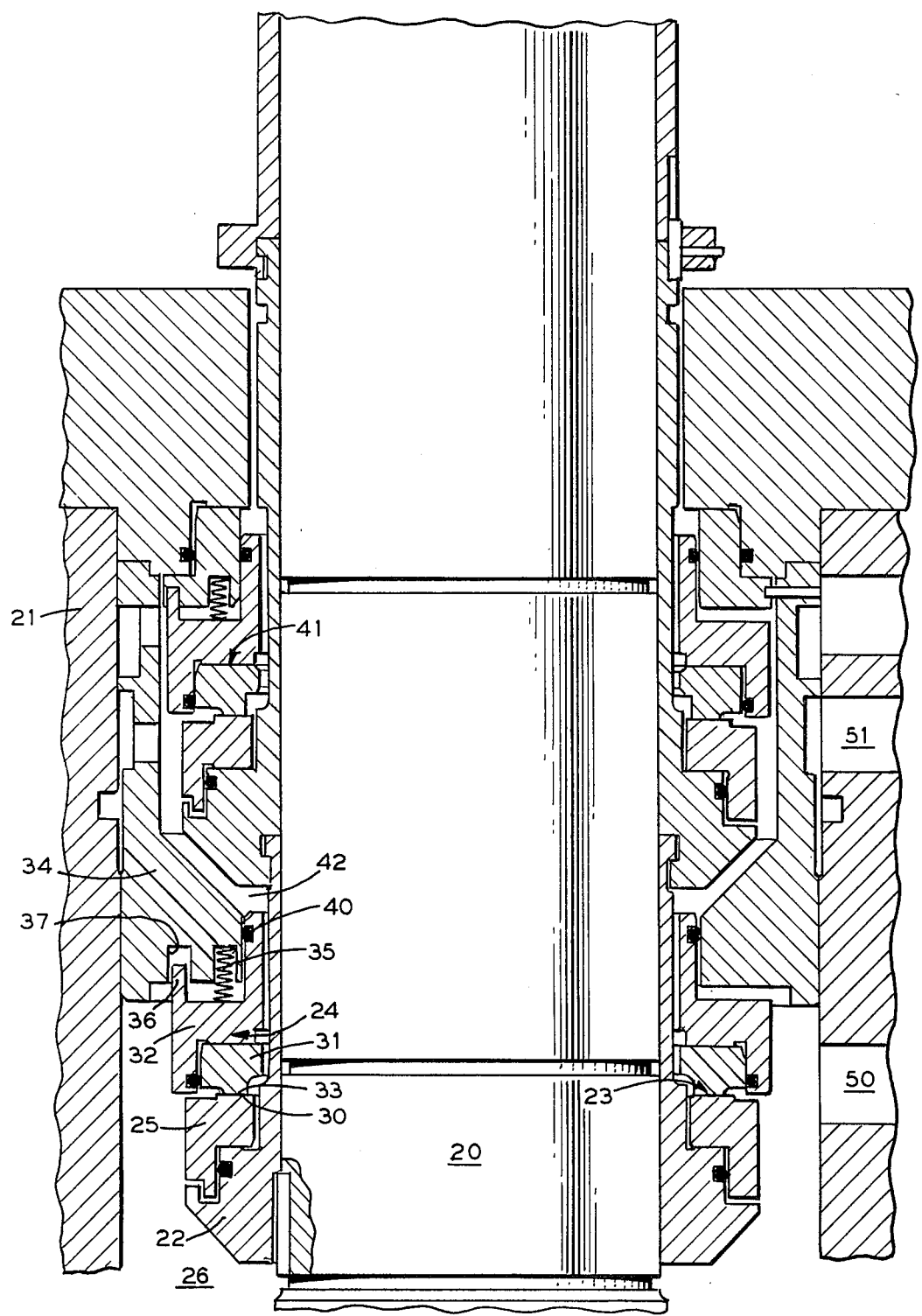
FIG. 5 is an elevational view, in section, of a shaft seal arrangement embodying the principal features of the invention.

In accordance with the invention and referring now to FIG. 5, a shaft 20 longitudinally extends through a housing 21. A shaft sleeve 22 is concentrically disposed and keyed in a fluid tight relation about part of the shaft 20. A dynamic floating face seal assembly, indicated in its entirety as 23, having a non-rotating axially floating seal ring 24 and a rotatable seal runner 25, is disposed between the shaft sleeve 22 and the housing 21 to form a high pressure chamber 26.

The seal runner 25, which is attached to and rotates with the shaft sleeve 22, has an annular upper sealing face 30 that is disposed transversely with respect to the longitudinal axis of the shaft 20.

The seal ring 24, includes a sealing member 31 and a seal thrust disc 32 that acts as a carrier for the sealing member 31. The seal member 31 has an annular lower sealing face or seal nose 33 that is disposed transversely with respect to the shaft axis and is longitudinally opposite the face 30 of the seal runner.

A generally annular seal gland 34 is secured to the housing 21. The seal ring 24 is attached to the seal gland 34 by one or more spring members 35. An anti-rotation device 36, attached to the seal thrust disc 32, fits into a longitudinally disposed slot 37 that is formed in a gland 34. Although this lug connection does not allow the seal ring 24 to rotate, sufficient clearance is provided between the slot 37 and anti-rotation device 36 to permit longitudinal and angular motion of the ring 24 with respect to both the gland 34 and seal runner 25. A secondary seal 40 seals the potential axial leakage path between the seal ring and the gland.

A second similar seal assembly, indicated in its entirety as 41, is longitudinally spaced above the seal assembly 23 described above. A low pressure chamber 42 separates the seal assemblies 23 and 41. Connections 50 and 51, respectively leading to the high pressure chamber 26 and the low pressure chamber 42 may be utilized in fluid communication with external pressure sources (not shown) to regulate pressure in these chambers.

Figure 6A:
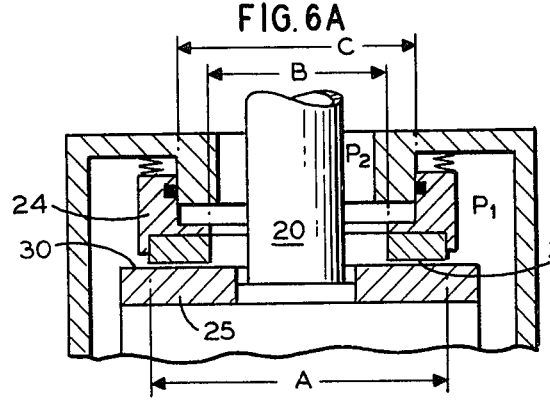
FIG. 6 includes a sectional view (FIG. 6A) of a shaft seal arrangement embodying the principles of the invention, and a diagrammatic superposed planar view (FIG. 6B) of the counteracting concentric hydraulic opening and closing area profiles.

As is best shown in FIG. 5 and schematically in FIG. 6, the seal ring 24 is constructed in a configuration such that it includes all of the area surfaces affected by the hydraulic force balance, i.e. used to define the hydraulic balance ratio (b). The seal runner 25 is constructed such that the radial width of the annular sealing face 30 extends significantly beyond the transverse distance which the sealing face 30 is expected to transverse with respect to the seal nose 33 due to the maximum lateral displacement of the shaft at the seal. Since the seal ring 24 is free to axially float and not rigidly attached to the gland 34, its interaction with the seal runner 25 is essentially unaffected by thermal or pressure distortions of the gland.

Figure 7A:
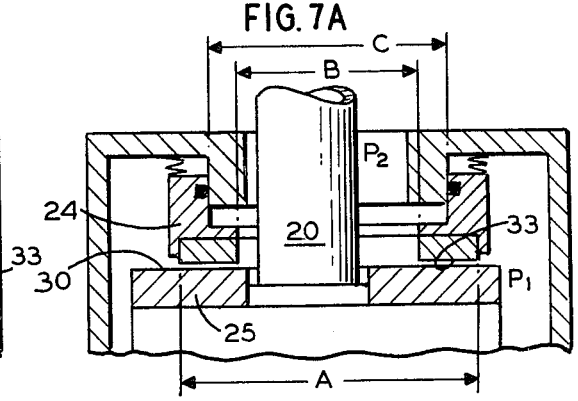
FIG. 7 includes sectional view (FIG. 7A) of the arrangement of FIG. 6 wherein the shaft has been displaced to the left and a diagrammatic superposed planar view (FIG. 7B) illustrating the maintenance of counteracting concentric hydraulic opening and closing area profiles.
Figure 6B:
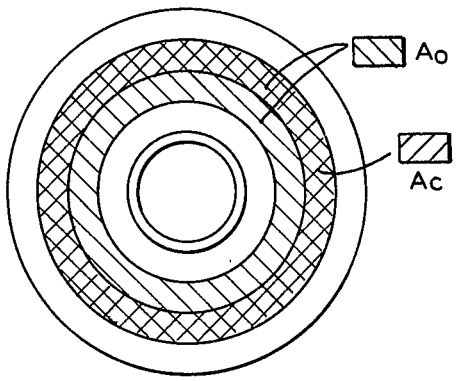
Figure 7B:
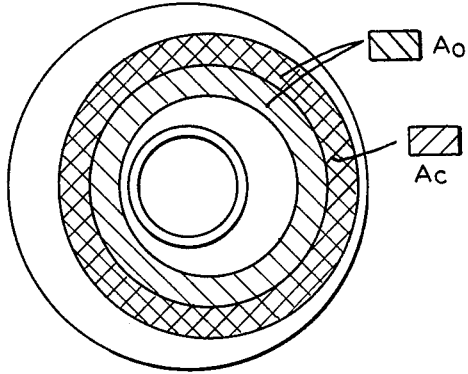

Hence, as is best shown in FIG. 6 and FIG. 7, hydraulic moment unbalance, due to shaft displacement is eliminated. FIG. 6 schematically illustrates a seal made in accordance with the invention wherein the centerlines of the rotating and non-rotating members are coincident so that the opening ($A_o$) and closing ($A_c$) areas are concentric as is best shown in the superposed view of FIG. 6B. In FIG. 7, the shaft has been displaced to the left. The opening ($A_o$) and closing ($A_c$) areas remain concentric since both the opening area and closing areas (hence, the balance ratio) are defined only by surfaces on the floating member 24. The rotating member 25 is designed with sufficient diametrical cross-section or width such that the sealing face of the floating member 24 cannot run off with respect to the edges of the rotating member 25 at maximum shaft displacement. Thus, the opening and closing areas cannot lose concentricity with respect to each other.

It will be evident to those skilled in the art that changes may be made without departing from the spirit of the invention covered in the claims. Although the axially floating balanced member, for instance, is not rotating in the embodiment described, the balance member could be allowed to float freely while not being restrained from rotation such as when it is attached to the shaft sleeve. Moreover, the seal arrangement or assembly need not be utilized as shown (FIG. 5) in conjunction with similar seals in tandem or external pressure source connections which regulate the pressure in the high and low pressure chambers.

The embodiments of the invention in which an exclusive property of privilege is claimed are defined as follows:

1. A fluid seal arrangement for a high pressure vertical pump for use in a nuclear reactor cooling system comprising: a housing containing a fluid pressurizable internal chamber; a shaft passing through the chamber wherein said shaft is laterally deflectable;
   a seal runner mounted on the shaft for rotation therewith within the chamber having an annular sealing face disposed transversely to the shaft axis;
   a seal ring attached to the housing about the shaft in axially floating relationship within the pressure chamber generally opposite said seal runner;
   said seal ring having a first annular area surface bounded by an inner balancing diameter and an outer diameter disposed transversely to the shaft axis, said first annular area surface being subject to fluid closing forces acting to urge the seal ring axially toward the annular sealing face of the runner when the chamber is pressurized;
   said seal ring having a stepped area surface generally opposite the first area surface and disposed transversely to the shaft axis including an annular sealing face and a second annular area surface;
   said annular sealing face axially projecting toward the seal runner and being bounded by an inner diameter and an outer diameter; said second annular surface being internally bounded by the outer diameter of the annular sealing face and a larger outer diameter; said second annular area surface being subject to fluid opening forces acting to urge the seal ring axially away from the annular sealing face of the runner when the chamber is pressurized;
   said outer diameter of the sealing face being greater than the balancing diameter such that the closing forces acting on the first annular area surface exceed the opening forces acting on the second annular area surface, the excess closing forces being balanced by an interfacial fluid film that developes between the annular sealing face of the seal ring and the seal runner when the chamber is pressurized; and
   said annular sealing face of the seal runner having a width sufficiently wider than the annular sealing face of the seal ring to preclude run off of the seal faces at maximum lateral shaft deflection.

2. A fluid seal arrangement, as defined in claim 1, wherein the seal arrangement divides the chamber into a high pressure portion and a low pressure portion.

3. A fluid seal arrangement, as defined in claim 2, further comprising means for establishing fluid communication between external pressure sources and the high pressure portion and the low pressure portion.

4. A fluid seal arrangement, for a high pressure vertical pump for use in a nuclear reactor cooling system comprising: a housing containing a fluid pressurizable internal chamber; a shaft passing through the chamber wherein said shaft is laterally deflectable;
   a seal runner mounted about the shaft in axially floating relationship for rotation therewith within the chamber;
   a seal ring fixedly attached to the housing about the shaft generally opposite said seal runner, said seal ring having an annular sealing face disposed transversely to the shaft axis;
   said seal runner having a first annular area surface bounded by an inner balancing diameter and an outer diameter disposed transversely to the shaft axis, said first annular area surface being subject to fluid closing forces acting to urge the seal runner axially toward the annular sealing face of the ring when the chamber is pressurized;
   said seal runner having a stepped area surface generally opposite the first area and disposed transversely to the shaft axis including an annular sealing face and a second annular area surface;
   said annular sealing face axially projecting toward the seal ring and being bounded by an inner diameter and an outer diameter;
   said second annular surface being internally bounded by the outer diameter of the annular sealing face and a larger outer diameter, said second annular area surface being subject to fluid opening forces acting to urge the seal runner axially away from the annular sealing face of the ring when the chamber is pressurized;
   said outer diameter of the sealing face being greater than the balancing diameter such that the closing forces acting on the first annular area surface exceed the opening forces acting on the second annular area surface, the excess closing forces being balanced by an interfacial fluid film that developes between the annular sealing face of the seal runner and the seal ring when the chamber is pressurized; and said annular sealing face of the seal ring having a width sufficiently wider than the annular sealing face of the seal runner to preclude run off of the seal faces at maximum lateral shaft deflection.

5. A fluid seal arrangement, as defined in claim 4, wherein the seal arrangement divides the chamber into a high pressure portion and a low pressure portion.

6. A fluid seal arrangement, as defined in claim 5, further comprising means for establishing fluid communication between external pressure sources and the high pressure portion and the low pressure portion.

* * * * *

UNITED STATES PATENT AND TRADEMARK OFFICE
CERTIFICATE OF CORRECTION

PATENT NO. : 4095806
DATED : June 20, 1978
INVENTOR(S) : John D. Dempsey

It is certified that error appears in the above-identified patent and that said Letters Patent are hereby corrected as shown below:

Column 5, line 57, delete "$(P_{CL})$" and insert -- $(F_{CL})$ --.

line 6, change "transverse" to

--traverse--.

Signed and Sealed this

*Sixteenth* Day of *October 1979*

[SEAL]

Attest:

RUTH C. MASON
*Attesting Officer*

LUTRELLE F. PARKER
*Acting Commissioner of Patents and Trademarks*